United States Patent
Pillilli et al.

(10) Patent No.: US 11,803,643 B2
(45) Date of Patent: Oct. 31, 2023

(54) BOOT CODE LOAD SYSTEM

(71) Applicant: Intel Corporation, Santa Clara, CA (US)

(72) Inventors: Bharat S. Pillilli, El Dorado Hills, CA (US); Eswaramoorthi Nallusamy, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 16/785,266

(22) Filed: Feb. 7, 2020

(65) Prior Publication Data

US 2020/0175169 A1 Jun. 4, 2020

(51) Int. Cl.
G06F 21/57 (2013.01)
G06F 13/42 (2006.01)
G06F 9/4401 (2018.01)

(52) U.S. Cl.
CPC .......... G06F 21/575 (2013.01); G06F 9/4401 (2013.01); G06F 9/4406 (2013.01); G06F 13/4282 (2013.01)

(58) Field of Classification Search
CPC .... G06F 21/575; G06F 9/4401; G06F 9/4406; G06F 13/4282
See application file for complete search history.

(56) References Cited

U.S. PATENT DOCUMENTS

| | | | |
|---|---|---|---|
| 2006/0064575 A1* | 3/2006 | Jo | G06F 9/4403 713/2 |
| 2012/0137119 A1* | 5/2012 | Doerr | G06F 21/575 713/100 |
| 2014/0156984 A1* | 6/2014 | Roh | G06F 15/177 713/2 |
| 2020/0257521 A1* | 8/2020 | Jayakumar | G06F 9/4401 |
| 2021/0097184 A1* | 4/2021 | Rao | G06F 21/575 |

OTHER PUBLICATIONS

"Intel C622 Chipset Product Specifications", download from https://ark.intel.com/content/www/us/en/ark/products/97340/intel-c622-chipset.html, 2017, 4 pages.
"STM32L4—Flash, Embedded Flash memory, revision 3.2", life. augmented, 2018, 35 pages.
Cypress Perform, "Serial Peripheral interface (SPI) Slave 2.41", PSoC® Creator™ Component Datasheet, Cypress Semiconductor Corporation, 198 Champion Court, San Jose, CA 95134-1709, Revised Sep. 16, 2014, 40 pages.

* cited by examiner

*Primary Examiner* — Glenn A. Auve
(74) *Attorney, Agent, or Firm* — Compass IP Law PC

(57) ABSTRACT

Examples described herein provide a hardware-software interface solution reads the boot code in segments into a buffer. A given boot code segment is stored in the buffer. A second buffer can be written-to with another boot code segment while the boot code segment in the buffer is read-from. A central processing unit (CPU) socket provides coordination such that one or more CPU sockets have copied the segment before permitting the segment to be overwritten in the buffer.

20 Claims, 6 Drawing Sheets

BOOT CODE LOAD SYSTEM

Platform firmware size is an important metric that determines processor boot time such as in multiple central processing unit (CPU) socket systems. The firmware size is ever increasing due to increase in complexity of server CPU system-on-chips (SoCs). The add-on effect of multi-socket platforms is that all sockets fetch and run the same code in parallel. During the platform boot process, cross-socket coherency may not be able to be leveraged. A CPU socket can fetch a Basic Input/Output System (BIOS) from boot storage device directly using a Serial Peripheral Interface (SPI) to the boot storage device. An SPI interface can permit synchronous serial communications in full duplex mode. In a 4 CPU-socket server platform where BIOS size can be assumed to be approximately 1 MB, the storage device would receive 4 MB of data fetch on the link, which would cause interface contention and delays in terms of boot time for the CPUs.

DETAILED DESCRIPTION

Figure 1:
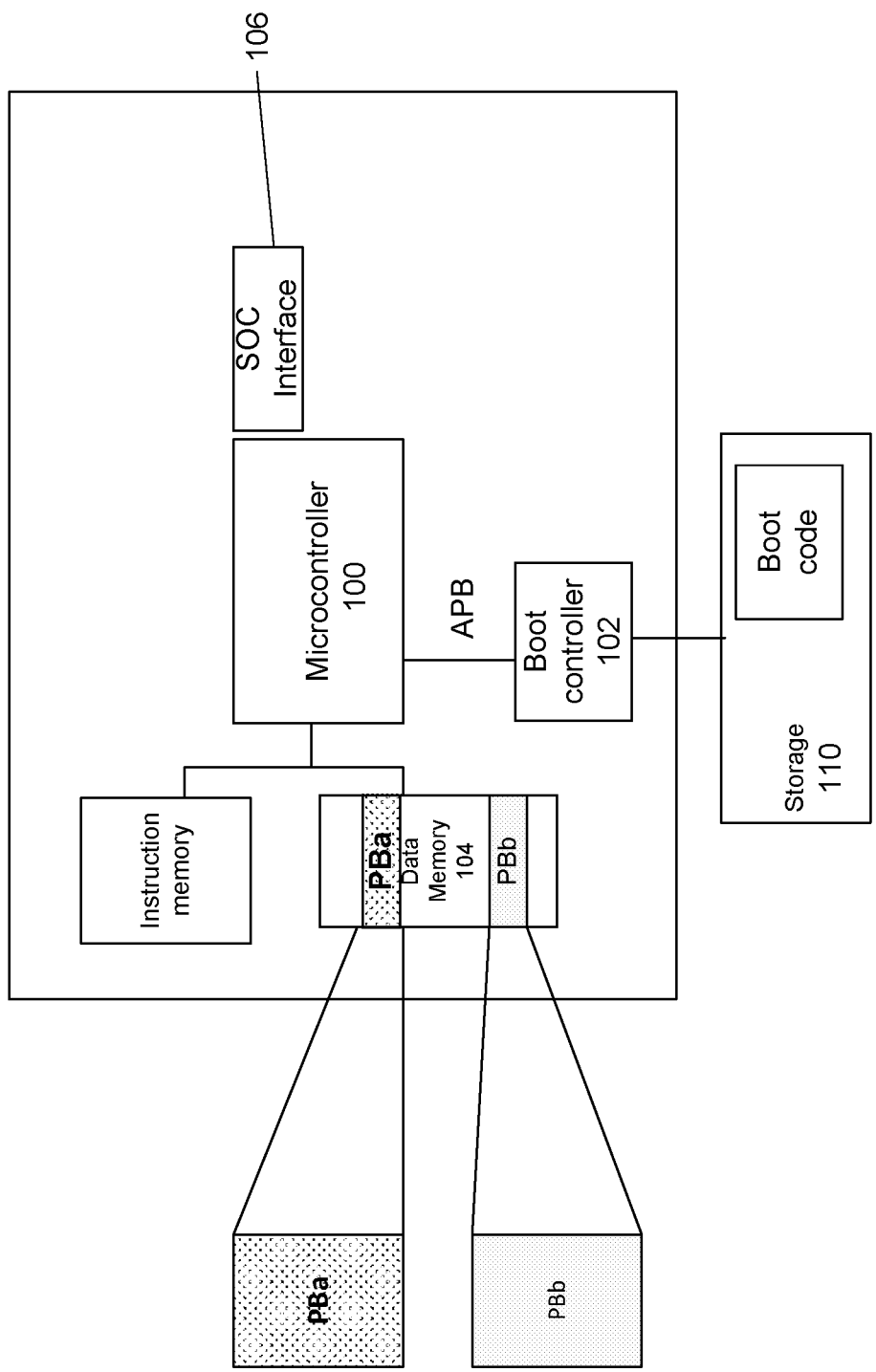
FIG. 1 depicts a server CPU boot storage controller design.

Some SPI controllers implement prefetching of BIOS. A SPI prefetch buffer can be 64B in some examples. When a SPI read request with a cache line aligned address is received from a processor, the SPI controller prefetches 64B of content from boot storage and serves subsequent read requests falling within this cache line using the prefetch buffer content. Any read request that is outside the cache line will be blocked until the pending prefetch of 64B is complete. A multi-CPU socket platform may not allow access of prefetched BIOS to the CPUs due to lack of co-ordination among CPUs and between CPUs and the SPI controller. Co-ordination among CPUs to avoid multiple fetches of the same content may not occur for use of a SPI prefetch buffer architecture for multi-socket platforms. Co-ordination can involve a central arbiter deciding which CPU can fetch content. This can result in boot code content being fetched as many times as the number of processors in the platform. In addition, an SPI interface to a boot code storage can be a relatively low bandwidth interface and can introduce delays in copying portions of boot code.

Various embodiments provide for a part of a boot code to be loaded from boot code storage and executed by a CPU to set up multiple buffers that store other boot code segments. Various embodiments provide for buffering boot code in segments with co-ordination among processors that access the boot code to access a boot code segment. While one or more processors access boot code from a first buffer, another segment or segments of boot code can be copied over an interface from boot storage to a second buffer. A segment can be one or more instructions of boot code. The another segment or segments can be accessed next by one or more processors from the second buffer and the first buffer is used to store yet another segment of boot code. A boot code segment buffered on one of the CPU sockets can be copied by other CPU sockets before the segment is permitted to be overwritten. Segments can be stored in memory accessible to a boot storage controller. Various embodiments can reduce the boot code fetch over a link in an 8-socket server platform from approximately 8 MB to 1 MB and can leverage spatial locality and reuse microcontroller data memory (e.g., random access memory) that exists for other use cases.

Various embodiments can help address preferences set by data center customers for improved boot times for multiple CPU socket platforms. For example, autonomous segments with multi-socket (e.g., multiple CPU socket) platforms where the boot times are to be short (e.g., ~2 seconds) can see boot time performance benefit. Bare-metal provisioning, as in a cloud service original equipment manufacturer (OEM) dedicating a platform to a customer to load their own boot code on-demand over a network can benefit from reduced boot code loading times in multiple CPU socket systems. A CPU socket can be a connector to a motherboard or circuit board and that includes a CPU and provides an electrical interface with the CPU.

In some embodiments, boot code can be one or more of: Basic Input/Output System (BIOS), Universal Extensible Firmware Interface (UEFI) or a boot loader. A BIOS can be firmware executed by a processor to perform hardware initialization during a booting process (e.g., power-on startup), and provide runtime services for operating systems and programs. The BIOS firmware can be pre-installed on a personal computer's system board or accessible through an SPI interface from a boot storage (e.g., flash memory). In some examples, a BIOS can be stored on a device and accessible from the device by one or more cores or CPUs using an interface such as Serial Peripheral Interface (SPI) or other interface (e.g., PCIe). BIOS can initialize and test the system hardware components and loads a boot loader from a memory device which initializes and executes an operating system. The OS, in some examples can be Linux®, Windows®, FreeBSD®, Android®, MacOS®, iOS®, or any other operating system. The OS and driver can execute on a CPU sold or designed by Intel®, ARM®, AMD®, Qualcomm®, IBM®, Texas Instruments®, among others.

In some examples, a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

FIG. 1 depicts a boot storage controller system. The boot storage controller system can be used by a CPU to load boot firmware code or boot code for execution and provide boot code to one or more other CPU nodes. Boot controller 102 can be implemented with a firmware layer separate from an input/output controller. For example, an interface controller can be instantiated below a micro-controller 100, where micro-controller 100 can perform a host interface (e.g., transaction decoding, or security filtering) and translate a transaction to an SPI operation or transaction compatible with an interface 106 with boot code storage 110. Boot code storage 110 can store boot code, in some examples. In some examples, boot controller 102 can manage or coordinate boot code loading for multiple CPU nodes.

In this example, PBa and PBb are buffers in memory 104. Memory 104 can be a memory device and buffers PBa and PBb are allocated in the memory device (e.g., by execution of a boot code). In other examples, even more than two buffers can be allocated such as 4, 8, 16 or other numbers. Boot controller 102 can load a variable size block (e.g., 1 KB, 1 MB or any size) of boot code from boot code storage 110 into buffer PBa or PBb. Any segments of boot code can be copied into PBa or PBb and the segments need not be contiguous. In some examples, the boot code can initialize system data memory (e.g., memory reference code) and initialize coherent interconnect fabric with one or more CPU nodes (e.g., UPI initialization).

A boot code can have a header file that identifies a map of what boot code is to be copied by a CPU. For example, a .h file for a BIOS can have a flash image layout map of which segments of the BIOS are to be copied and/or which UEFI firmware component to copy.

An example use of PBa and PBb is as follows. When a CPU boots (or re-boots), a boot code is loaded and executed by a micro-controller 100. The boot code indicates to allocate at least PBa and PBb in memory 104 (e.g., data memory). Next, boot controller 102 reads a map of boot code segments to copy to memory 104. Boot controller 102 copies a first segment of boot code from boot code storage 110 to a buffer PBa and allows one or more other CPU sockets to copy the first segment boot code. While one or more other CPU sockets copy the first segment boot code from PBa, boot controller 102 copies a next segment of boot code from boot code storage 110 into PBb. After all of the one or more other CPU sockets indicate that the PBa has been completely read, PBa is available for boot controller 102 to use to copy a next segment of boot code from boot code storage 110 into PBa. Use of PBa and PBb can "ping-pong" where one buffer is used to serve a segment of boot code whereas another buffer is used to store a segment of boot code for later access. When all CPU sockets have accessed a segment from a buffer, the buffer is released to be used to storage another segment of boot code.

Figure 2:
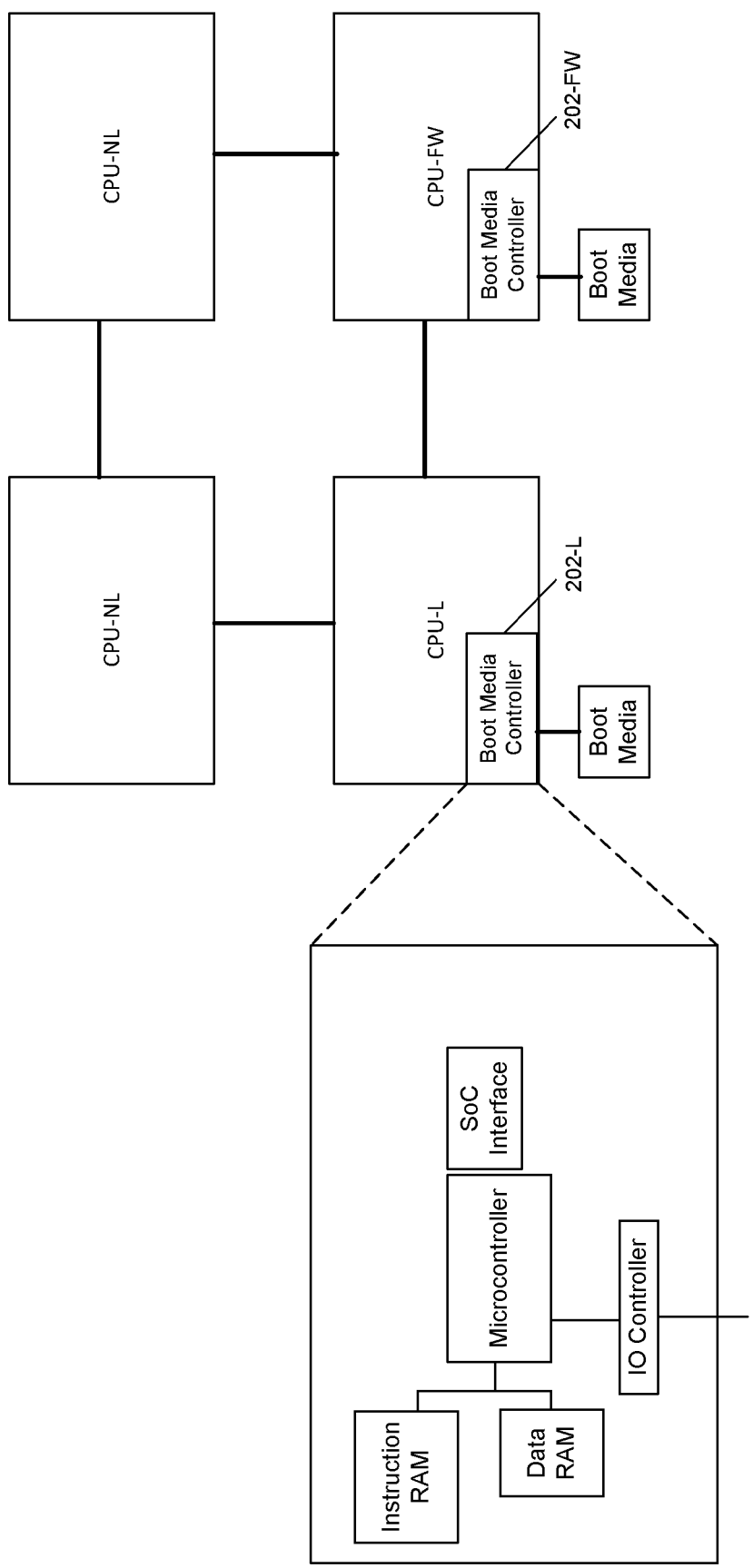
FIG. 2 shows a multi-socket server CPU platform.

FIG. 2 shows a 4-socket server CPU platform with integrated boot enabled. More than or fewer than 4 sockets can be supported (e.g., 2 sockets, 8 sockets, 16, sockets and so forth). Various embodiments can be extended to Platform Controller Hub (PCH) enabled platforms.

In this example, CPU-L or CPU-FW include or use a multiple buffer system to store at least one segment of a boot code in accordance with embodiments described herein. Accordingly, boot media controller 202-L used by CPU-L can load a segment of boot code, and any or all of CPU-NL0, CPU-NL1, or CPU-FW can copy a segment of boot code from a buffer of a boot media controller of CPU-L and indicate when the segment has been copied so that boot media controller 202-L can use the buffer to store another segment.

CPU-L or CPU-FW boot media controller (boot media controller 202-L or boot media controller 202-FW) can control fetches of segments of boot code. Boot media controller 202-L or boot media controller 202-FW can send a trigger/sync to CPU-NLs to fetch this segment of code. If both CPU-L and CPU-FW can source BIOS, a directly connected CPU node can access boot firmware code from either CPU-L or CPU-FW. CPU-NL can wait for trigger/synch from CPU-L after it fetches a segment of code. Meanwhile, boot media controller 202-L or boot media controller 202-FW will continue to fetch the next segment of code. Boot media controller 202-L or boot media controller 202-FW will check that all sockets have consumed the given segment (since it is the one tracking the segments) before it fetches a segment that will override an already allocated prefetch buffer. Note that Boot media controller 202-L or boot media controller 202-FW can be agnostic to cross-socket boot code handshakes and respond to requests based on the socket type. Once all segments are fetched, CPU-L or CPU-FW boot strap processor (BSP) relieves the boot controller 102 to use the data RAM for other purposes. A BSP can be a core that executes boot firmware on a CPU node.

Boot media controller 202-FW used by CPU-FW can load a segment of boot code, and any or all of CPU-NL0, CPU-NL1, or CPU-L can copy a segment of boot code from a buffer of a boot media controller of CPU-FW and indicate when the segment has been copied so that boot media controller 202-FW can use the buffer to store another segment. In some examples, CPU-NL0, CPU-NL1, or CPU-L can have direct connection to CPU-FW (fully connected) to copy the boot code segment. Note that not all CPU-NL0, CPU-NL1, or CPU-L execute the same boot code segments. A CPU node can execute some of the fetched boot firmware code depending on its particular configuration.

CPU-L can be a legacy CPU node, as determined by a CPU general-purpose input/output (GPIO) strap and indicates where the legacy cycles such as BIOS region memory-mapped I/O (MMIO) to copy boot firmware code, secure transactions, or I/O read/write transactions from CPU-NL or CPU-FW. A legacy CPU (CPU-L) can be CPU node can be connected to a boot firmware storage.

CPU-FW can be a CPU with attached boot media. CPU-FW can use a boot media controller, determined by general purpose input output (GPIO) strap to indicate a source of boot firmware code, directs boot code region targeted MMIO arising from CPU-NLs or CPU-FW to the CPU-FW attached boot storage controller.

CPU-NL can be a non-legacy CPU socket, determined by GPIO strap, and can access boot code from another CPU (e.g., CPU-L or CPU-FW). A non-legacy CPU (CPU-NL) may not be connected to a boot firmware storage to load boot firmware.

In some examples, a SPI compatible interface is used between boot media controller 202-L or boot media controller 202-FW and a boot media. Any CPU-NL0 or CPU-NL1 can use a UPI link (or other connection) to access a boot code segment and interact with boot media controller 202-L or boot media controller 202-FW. Other interfaces can be used such as PCIe, CXL, USB, AMBA or another or connection, fabric, or network standard.

Figure 3:
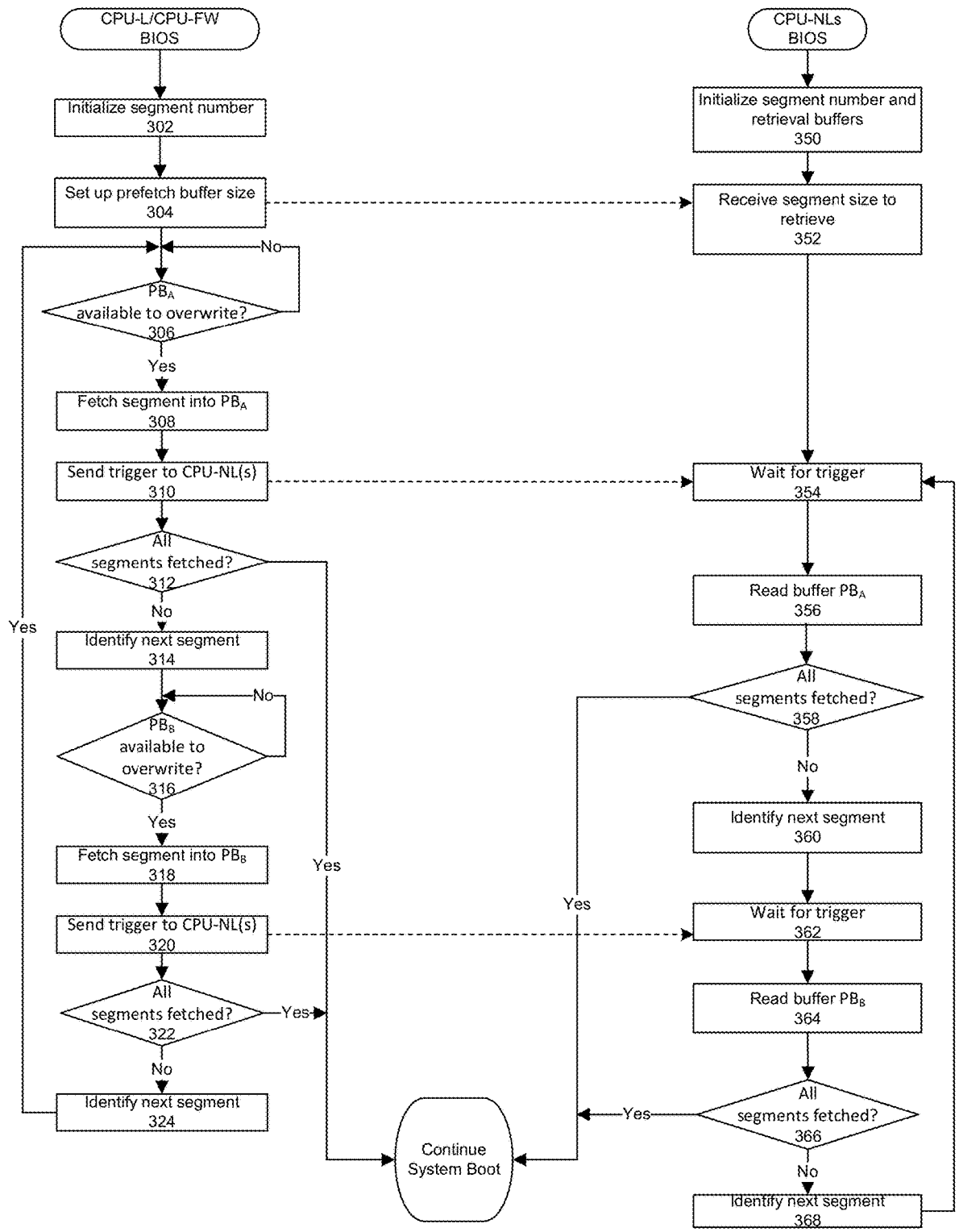
FIGS. 3 and 4 depict example processes.

FIG. 3 depicts a process. An example outline of the platform/BIOS view of the flow is shown. CPU-L/CPU-FW/CPU-NL each fetch the minimum required BIOS code in parallel. At 302, a segment number M is initialized. Segment M represents a flash address space from which to read boot code. Segment M is initialized to 0. Segment M=segment number, not necessarily first segment in firmware component location in flash.

At 304, a prefetch buffer size is set up. CPU-L or CPU-FW BSP BIOS sets up the boot storage controller with the prefetch buffer size. Note that prefetch buffer size is determined by BSP BIOS and accounts for the boot controller hardware capabilities. A total buffer can be a max of 128 KB, as in 64 KB each to allow for ping-pong. A server CPU boot media controller can be set-up with Prefetch Buffer (PB) Size N. Indicate the Size N to one or more CPU-NLs. A CPU-NL can wait for size N to fetch.

At 306, a determination is made if the buffer $PB_A$ is available to be overwritten. For example, a value of $PB_A=0$ can indicate the buffer is available to be overwritten such as it is empty or contents of it were read by one or more CPU-NLs. If the buffer $PB_A$ is available to be overwritten, 308 follows. If the buffer $PB_A$ is not available to be overwritten, 306 repeats. At 308, a segment M of size N is fetched from boot media to buffer $PB_A$. At 310, trigger is sent to one or more CPU-NLs to indicate that buffer $PB_A$ is available to be read from.

At 312, a determination is made if all segments have been fetched. If all segments have been fetched, then the process can end and system boot can commence. If all segments have not been fetched, then the process can continue to 314. At 314, the next segment is identified. For example, Segment M can be incremented such that M=M+1.

At 316, a determination is made if the buffer $PB_B$ is available to be overwritten. For example, an indicator value of $PB_B=0$ can indicate the buffer is available to be overwritten such as it is empty or contents of it were read by one or more CPU-NLs. If the buffer $PB_B$ is available to be overwritten, 308 follows. If the buffer $PB_B$ is not available to be overwritten, 316 repeats. At 318, a segment M of size N is fetched from boot media to buffer $PB_B$. At 320, a trigger is sent to one or more CPU-NLs to indicate that buffer $PB_A$ is available to be read from.

At 322, a determination is made if all segments have been fetched. If all segments have been fetched, then the process can end and system boot can commence. If all segments have not been fetched, then the process can continue to 324. At 324, the next segment is identified. For example, Segment M can be incremented such that M=M+1.

On the right side of FIG. 3 is an example process for one or more CPU-NLs to perform. At 350, segment number and retrieval buffers are initialized. For example, a boot code segment number is initialized to Segment M=0 and retrieval buffers $PB_A$ and $PB_B$ can be initialized such that they have not been read. Accordingly, variables CPU-NLs $PB_A=0$ and CPU-NLs $PB_B=0$.

At 352, a segment size is received from a boot code agent. For example, a CPU-L or CPU-FW can provide a segment size of N determined in 304.

At 354, a trigger to read a retrieval buffer $PB_A$ is received. At 356, a CPU-NL reads a segment of boot code from retrieval buffer $PB_A$. During a read of the segment of boot code from retrieval buffer $PB_A$, an indicator value of $PB_A$ is set to 1 to indicate the buffer $PB_A$ is being accessed. After receipt of the read segment of boot code from retrieval buffer $PB_A$, the segment of boot code from retrieval buffer $PB_A$ is set to 0 to indicate the buffer $PB_A$ can be written to.

At 358, a determination is made if all segments have been fetched. If all segments have been fetched, then the process can end and system boot can commence. If all segments have not been fetched, then the process can continue to 360. At 360, the next segment is identified. For example, Segment M can be incremented such that M=M+1.

At 362, a trigger to read a retrieval buffer $PB_B$ is received. At 364, a CPU-NL reads a segment of boot code from retrieval buffer $PB_B$. During a read of the segment of boot code from retrieval buffer $PB_B$, an indicator value of $PB_B$ is set to 1 to indicate the buffer $PB_B$ is being accessed. After receipt of the read segment of boot code from retrieval buffer $PB_B$, the segment of boot code from retrieval buffer $PB_B$ is set to 0 to indicate the buffer $PB_B$ can be written to.

At 366, a determination is made if all segments have been fetched. If all segments have been fetched, then the process can end and system boot can commence. If all segments have not been fetched, then the process can continue to 368. At 368, the next segment is identified. For example, Segment M can be incremented such that M=M+1. The process continues to 354 to read from retrieval buffer $PB_A$.

Figure 4:
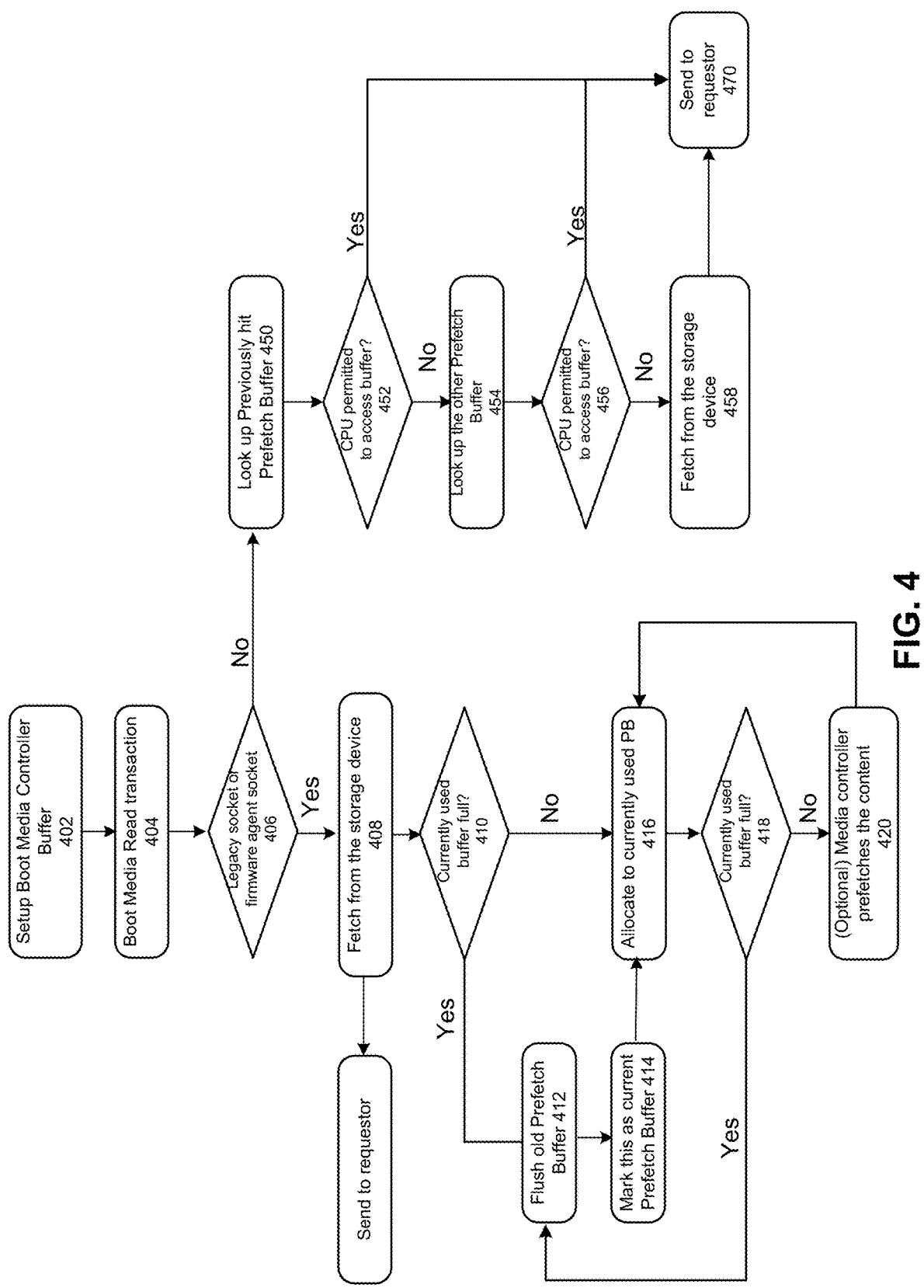

FIG. 4 depicts a process performed by a CPU node at start-up or reboot to fetch boot code. Boot media controller can perform this process. At 402, storage controller performs a boot code command to set up boot media controller buffer. At 404, the storage controller issues a read transaction to load a boot code. CPU-L/CPU-FW boot strap processor (BSP) boot code fetches the first segment of boot code by sending the required read transaction (e.g., MMIO). At 406, boot storage controller will determine if this is a CPU-L or CPU-FW since the boot storage has the information present (because CPUs are strapped as L/FW+socket ID). For a CPU-L or CPU-FW that is attempting to load boot code, the process continues to 408. For a CPU other than a CPU-L or CPU-FW that is attempting to load boot code, such as CPU-NL, the process continues to 450. If the incoming request is from CPU-L or CPU-FW, at 408, the CPU loads boot code from a locally attached storage device into a buffer and sends the response to the requesting socket and allocates the prefetch buffer.

At 410, a determination is made if the currently used buffer is full. If a currently used buffer is full, prefetch buffer selection occurs whereby a non-full buffer is selected for use at 412-416. For example, if PBA is full, then PBB is flushed and allocated for use to retrieve a portion of boot code. For example, if PBB is full, then PBA is flushed and allocated for use to retrieve a portion of boot code. Boot storage controller can independently perform a flush because CPU-L/CPU-FW agent boot code causes a given prefetch buffer that stores a boot code segment is read by another CPU socket before going to the next segment.

At 410, if a currently used buffer is determined to be not full, the process continues to 416 to allocate a currently used buffer for use.

At 418, a determination is made if the current used buffer is full. If a currently used buffer is full, the process continues to 412. If the currently used buffer is not full, the process continues to 420. At 420, the prefetch controller will fetch content into a free buffer.

At 450, a CPU-NL or other CPU that is to load boot code from a non-locally attached storage medium uses a boot storage controller to look up the same prefetch buffer that had a hit last time for this socket based on an CPU-NL socket ID. At 452, if the prefetch buffer responds to a request to use the prefetch buffer, then the prefetch buffer permits access and, at 470, provides a portion of boot code for use to the requester CPU. If it is a hit, then it responds with the data and updates the hint of last hit prefetch buffer for this specific socket ID.

If the first prefetch buffer incurs a miss, then the CPU will look up a second prefetch buffer. For a prefetch buffer that does not permit access, at least one other prefetch buffer is attempted to be accessed at 454. At 456, if the second prefetch buffer responds to a request to use the second prefetch buffer, then the second prefetch buffer permits access and, at 470, provides a portion of boot code for use to the requester CPU. If it is a hit, then the second prefetch buffer responds with the data and updates the hint of last hit prefetch buffer for this specific socket ID. But if at 456, there is a miss or lack of permission to access the second prefetch, at 458, the boot storage controller will attempt to fetch boot code from a locally attached storage device and, at 470, provides the boot code portion to the requester CPU. To account for potential error scenarios, if both buffers miss, then the request is sent to boot storage controller. While this would happen if there is an error in the boot code, this can attempt to avoid a hang scenario.

Figure 5:
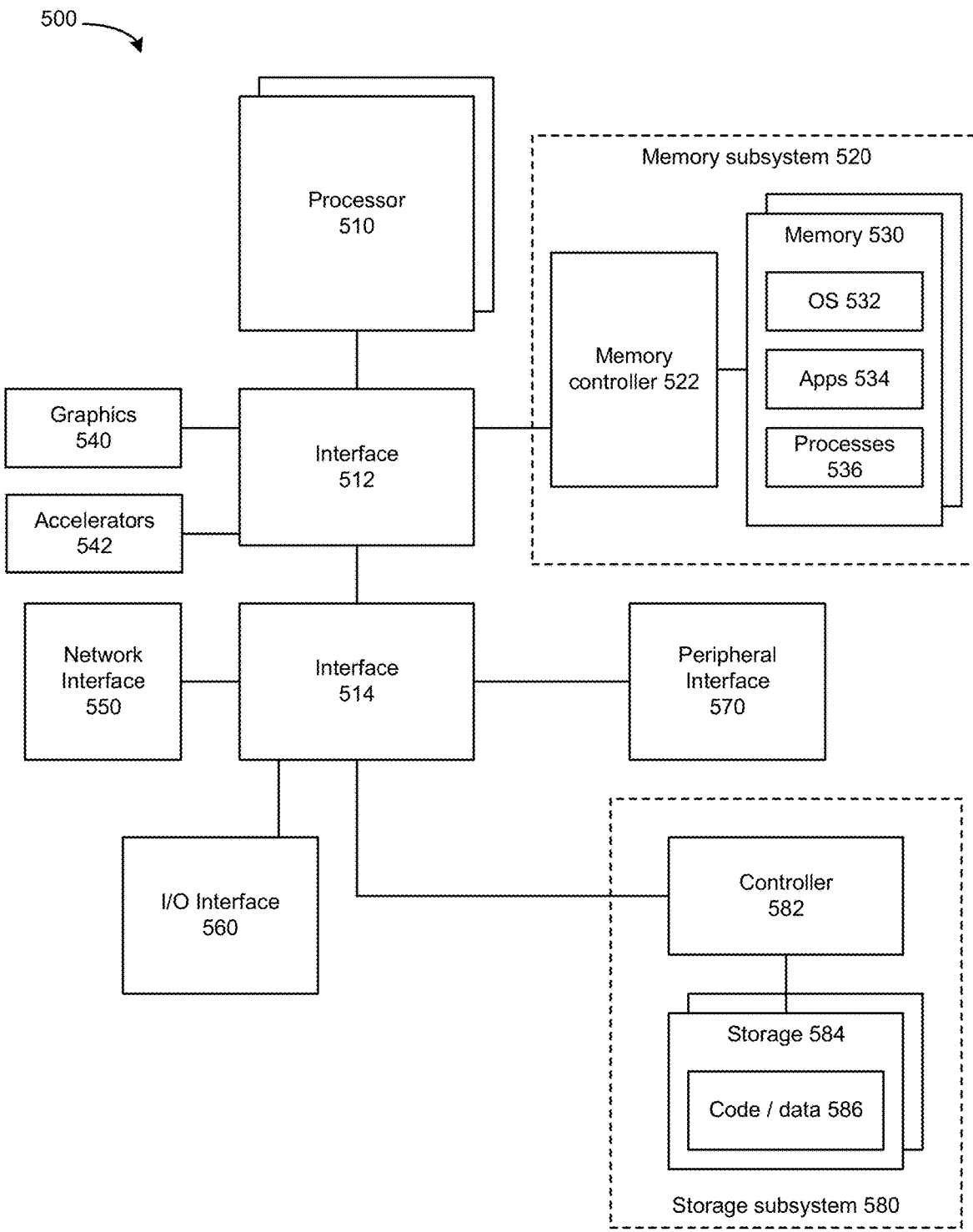
FIG. 5 depicts a system.

FIG. 5 depicts an example system. The system can use embodiments described herein to load a boot code from another CPU socket. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Any processor (including multiple sockets of CPUs or GPUs) can run a virtualized execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include stand-alone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 6:
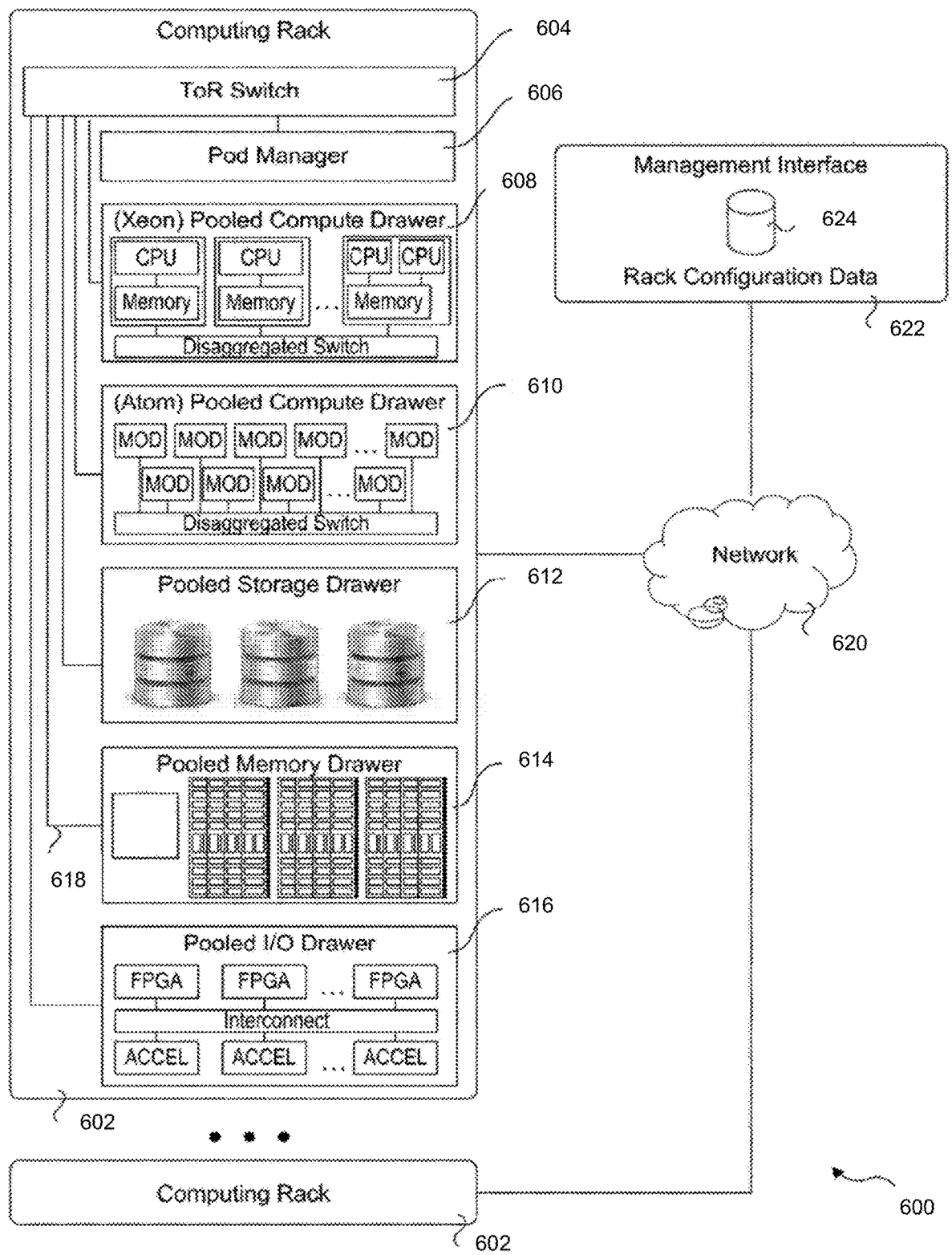
FIG. 6 depicts an example environment.

FIG. 6 depicts an environment 600 includes multiple computing racks 602, one or more including a Top of Rack (ToR) switch 604, a pod manager 606, and a plurality of pooled system drawers. Various embodiments can be used among racks to share content or data or results of processing or storing content. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 608, and Intel® ATOM™ pooled compute drawer 610, a pooled storage drawer 612, a pooled memory drawer 614, and a pooled I/O drawer 616. Any of the pooled system drawers is connected to ToR switch 604 via a high-speed link 618, such as a 40 Gigabit/second (Gb/s) or 100 Gb/s Ethernet link or a 100+ Gb/s Silicon Photonics (SiPh) optical link, or higher speeds.

Multiple of the computing racks 602 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage all of the racks in the pod. Alternatively, distributed pod managers may be used for pod management operations.

Environment 600 further includes a management interface 622 that is used to manage various aspects of the environment. This includes managing rack configuration, with corresponding parameters stored as rack configuration data 624.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

What is claimed is:

1. A method comprising:
retrieving, by a controller, a first portion of a boot code from a first memory device using a first connection;
storing, by the controller, the first portion of the boot code into a buffer; and
permitting at least one processor to copy the first portion of the boot code from the buffer while permitting the controller to retrieve a second portion of the boot code from the first memory device.

2. The method of claim 1, wherein the retrieving the first portion of the boot code from the first memory device comprises loading the first portion of the boot code from a storage device.

3. The method of claim 1, wherein the first connection comprises a Serial Peripheral Interface (SPI) compatible interface.

4. The method of claim 1, wherein the boot code comprises one or more of: a Basic Input/Output System (BIOS), Universal Extensible Firmware Interface (UEFI), or a boot loader.

5. The method of claim 1, comprising storing the second portion of the boot code in a second buffer.

6. The method of claim 1, wherein the first portion and the second portion are different portions of the boot code.

7. The method of claim 1, wherein the at least one processor comprise at least one central processing unit (CPU) node.

8. The method of claim 1, wherein the first connection provides a slower transfer rate than that of a second connection and wherein the at least one processor copy the first portion from the buffer using the second connection.

9. The method of claim 1, comprising:
after the first portion of the boot code is read from the buffer by the at least one processor, configuring the buffer to receive another portion of the boot code and permitting the buffer storing the another portion of the boot code to be read by the at least one processor.

10. The method of claim 1, comprising:
storing the second portion of the boot code in a second buffer;

permitting the second buffer storing the second portion of the boot code to be read by the at least one processor; and after the second portion is read from the second buffer by the at least one processor, configuring the second buffer to receive another portion of the boot code.

11. The method of claim 10, wherein the buffer is read-from while the second buffer is written-to.

12. A computing platform that comprises:
a memory;
at least one processor coupled to the memory; and
circuitry to:
retrieve a portion of a boot code from a boot code storage device using a first connection;
store the portion of the boot code into a buffer in the memory; and
coordinate boot code loads by at least two processors of the portion of the boot code from the buffer and store a second portion of the boot code from the boot code storage device into a second buffer in the memory.

13. The platform of claim 12, wherein the buffer is read-from while the second buffer is written-to.

14. The platform of claim 12, wherein the circuitry is to retrieve a third portion of the boot code from the boot code storage device using the first connection;
store the third portion into the buffer in the memory; and
coordinate boot code loads by at least two processors of the second portion from the second buffer.

15. The platform of claim 12, wherein the first connection comprises a Serial Peripheral Interface (SPI) compatible interface.

16. The platform of claim 12, wherein the boot code comprises one or more of: a Basic Input/Output System (BIOS), Universal Extensible Firmware Interface (UEFI), or a boot loader.

17. The platform of claim 12, wherein the portion and second portion are different portions of the boot code.

18. The platform of claim 12, wherein the at least one processor coupled to the memory comprises at least one central processing unit (CPU) node.

19. The platform of claim 12, wherein the first connection provides a slower transfer rate than a second connection between the memory and a central processing unit (CPU) node and wherein the CPU node is to use the second connection to access the portion of the boot code from the buffer.

20. The platform of claim 12, comprising one or more of: a rack, server, data center, or network interface, wherein the rack, server, data center, or network interface are to perform a boot operation based on the boot code.

* * * * *